United States Patent [19]
Gallup

[11] Patent Number: 5,858,245
[45] Date of Patent: Jan. 12, 1999

[54] INHIBITION OF SILICATE SCALE FORMATION

[75] Inventor: Darrell L. Gallup, Santa Rosa, Calif.

[73] Assignee: Union Oil Company of California, El Segundo, Calif.

[21] Appl. No.: 978,191

[22] Filed: Nov. 25, 1997

Related U.S. Application Data

[63] Continuation of Ser. No. 680,477, Jul. 15, 1996, abandoned.

[51] Int. Cl.$^6$ ........................................................ C02F 5/10
[52] U.S. Cl. ........................ 210/698; 60/641.2; 60/641.5; 210/747; 166/310
[58] Field of Search ................................ 60/641.2, 641.5; 166/300, 310; 210/696, 698, 743, 747

[56] References Cited

U.S. PATENT DOCUMENTS

| | | | |
|---|---|---|---|
| 4,032,460 | 6/1977 | Zilch et al. | 210/698 |
| 4,479,543 | 10/1984 | Kalfayan et al. | 166/300 |
| 4,500,434 | 2/1985 | Jost et al. | 210/696 |
| 4,532,047 | 7/1985 | Dubin | 210/698 |
| 5,190,664 | 3/1993 | Gallup et al. | 210/698 |
| 5,200,165 | 4/1993 | Harper et al. | 423/339 |
| 5,229,003 | 7/1993 | Duyvesteyn | 210/638 |
| 5,277,823 | 1/1994 | Hann et al. | 210/696 |
| 5,328,690 | 7/1994 | Sikes | 424/401 |
| 5,342,787 | 8/1994 | Bardsley et al. | 436/72 |
| 5,403,493 | 4/1995 | Mouche et al. | 210/697 |
| 5,665,242 | 9/1997 | Gallup | 210/696 |

OTHER PUBLICATIONS

D.L. Gallup, "Brine pH Modification Scale Control Technology," Geothermal Resources Council Transactions Vo. 20, Sep./Oct. 1996, pp. 749–755.

D.L. Gallup, "Recovery of Silver–Containing Scales From Geothermal Brines," Geotherm. Sci. & Tech., 1995 vol. 4(3), pp. 175–187.

D.L. Gallup, "The Use of Reducing Agents for Control of Ferric Silicate Scale Deposition," Geothermics, Vol. 22, No. 1, pp. 39–48, 1993.

D.L. Gallup, "Recovery of Silver–Containing Scales From Geothermal Brines," Geothermal Resources Council Transactions, vol. 16, Oct. 1992, pp. 351–355.

D.L. Gallup, "Aluminum Silicate Scale Formation And Inhibition: Scale Characterization and Laboratory Experiments," Geothermics, Vol. 26, No. 4, pp. 483–499, 1997.

*Primary Examiner*—Peter A. Hruskoci
*Attorney, Agent, or Firm*—Gregory F. Wirzbicki; Shlomo R. Frieman

[57] ABSTRACT

A method for controlling fouling of a production or reinjection well, a flashing vessel or a heat-exchange surface exposed to a high-enthalpy geothermal brine that forms metal/silicon-containing scale comprises the addition of a metal complexing agent to the brine to form a fluid mixture containing a soluble metal/silicon component complex that inhibits the amount of scale formation when the temperature of the fluid mixture is reduced. The addition of a preferred metal complexing agent such as forms of EDTA, citric acid or acetic acid maintains dissolved aluminum species in the brine and inhibits the formation of aluminum silicate precipitate.

8 Claims, 2 Drawing Sheets

INHIBITION OF SILICATE SCALE FORMATION

This application is a continuation of application Ser. No. 08/680,477, filed Jul. 15, 1996 now abandoned.

FIELD OF THE INVENTION

This invention relates to the treatment of a hot aqueous brine solution from a geothermal reservoir. The brine contains various dissolved components which may have scaling and corrosive tendencies. More particularly, the invention relates to a treatment of a high-enthalpy, low salinity geothermal brine.

BACKGROUND

General processes by which geothermal brine can be used to generate electric power have, of course, been known for some time. Geothermal brine from a producing well, having a wellhead temperature of above 180° C. and a wellhead pressure of over about 400 psig, for example, can be flashed to a reduced pressure to convert some of the water or brine into steam. Steam produced in this manner is generally used in conventional steam turbine-type power generators to generate electricity.

Cooler, less pressurized, geothermal brine can be used in a closed-loop, binary fluid system in which a low-boiling point, secondary liquid (such as hydrocarbon) is vaporized by the hot brine. The vapor produced from the secondary liquid is then used in a gas turbine-generator to generate electricity. The vapor from the turbine is recondensed and reused.

In both instances, the "used" geothermal brine liquid is most commonly reinjected into the ground via a "reinjection well" to replenish the aquifer from which it was extracted and to prevent ground subsidence. Reinjection of geothermal brine into the reinjection well is also important to avoid the problems associated with the disposal of large amounts of saline and/or highly-contaminated and nearly saturated brine.

It is generally known that the solubility of most dissolved ions in geothermal brine decreases with a decrease in brine temperature. If dissolved ions are present near their saturation concentration in the brine, a significant reduction in the temperature of the system can result in supersaturation and precipitation of a portion of these ions. Precipitates can combine and deposit as a scale on any solid surface with which they come into contact, such as the vessel or conduit in which the brine is confined.

Liquid-dominated geothermal brine reservoirs may be conveniently divided into two types: one type having high-enthalpy fluids above 200 calories/gram; and one having low-enthalpy fluids below this value. High temperature type brines (i.e., high-enthalpy brines) have been defined by in-situ reservoir temperatures, the high temperature type having in-situ temperatures generally above 180° C., typically above 200° C., and most commonly above 220° C., whereas the low temperature type (i.e., low-enthalpy brines) have temperatures below these values. The high-enthalpy brines especially tend to dissolve reservoir rock or contacting solids and these brine types contain total dissolved solids (including ions) in concentrations ranging from around 2,000 to as much as 260,000 ppm by weight (ppmw).

Especially troublesome dissolved solid components contained in the high and low enthalpy brine are silicon components, which may be found at or near saturation concentrations in the form of oligomers or polymers of silicic acid. Such species tend to precipitate out of the brine at almost every stage of brine processing as the temperature is lowered, for example, as substantially pure silica, as a tightly adherent metal-silica/metal-silicate scale, or as other solidified silicon-containing components. In the case of metal-silicate scale, such as that resulting from iron silicate or aluminum silicate precipitation, the aluminum and iron silicates will exhibit relatively little precipitation (if any) or little co-deposition with silica, when the pH of the brine is less than about 4 or greater than about 9. However, precipitation of such silicates frequently occurs when the pH of the brine is within the range from about 4 to about 9, i.e., the pH range of the brine within which most geothermal industrial processing occurs. Thus, during most geothermal industrial processing the naturally occurring silica-rich or metal silicate-rich scale/precipitation must be inhibited (as the brine is cooled), or the scale must be removed frequently. Also, the precipitation tendency (and the consequent need to remove precipitate) increases as lower brine temperatures are reached.

The high-enthalpy or high temperature brines usually have larger saturation concentrations of dissolved solids and faster precipitation kinetics than those of the lower enthalpy brines. In low-enthalpy brine applications, heat-exchangers are commonly used for producing hot water. The brine's thermal energy is transferred within the heat-exchangers to the hot water. The heated water may in turn heat air (for space heating) or other fluids such as hydrocarbons (in a binary fluid system). Even though the low enthalpy brines may be saturated with dissolved solids, the limited amount of temperature reduction possible for these low-enthalpy (i.e., moderate temperature) brines ordinarily produces little or no precipitation and fouling of heat-exchange surfaces, or plugging of injection wells. The lack of significant precipitation or fouling in the low enthalpy brine is, at least in part, due to the relative stability of slightly supersaturated brines. And even if the supersaturated brine is not stable, the low precipitation rates (i.e., slow precipitation kinetics) at the moderate brine temperatures within these heat-exchangers normally inhibit large amounts of precipitation and fouling.

The removal of relatively large amounts of heat can produce significant levels of supersaturation. High-enthalpy brines therefore tend to produce copious quantities of scale which can plug conduits, injection wells, the subterranean formation in the vicinity of the immediate injection wells (up to about 50 feet from the wellbore), and quickly foul a conventional heat-exchanger. Normally, conventional heat-exchangers are not generally employed for high-enthalpy brines, even though extraction of heat from such brines using a heat-exchanger process may otherwise be beneficial.

Because of thermal conversion efficiencies, a condensing flash-method for extracting energy from such brines is often employed. Flashing is accomplished in a vessel where brine pressure is reduced. As a result, a portion of the brine is flashed to steam and other gases while the temperature of the residual brine is decreased and separated from the steam. Additional flash vessels can be employed to further flash the residual brine. Flashing is often accompanied by massive amounts of precipitate formation that may scale and eventually plug piping. Other processes which avoid a fouled heat transfer surface, such as total flow and direct-contact (fluid-to-fluid) heat-exchange processes, have also been proposed for high-enthalpy brines.

Because of massive scaling by the high enthalpy brines, various proposals have been made to decrease the scale formation in flash-condensing or other non-heat-exchange surface equipment. In a previous investigation of the scaling of turbine components it has been described that a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide and cuprous sulfide. Thin basal layers of fine-grained, iron-rich amorphous silica appeared to promote the adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, such scaling compositions were dramatically reduced or eliminated. (However, essentially no aluminum cations were contained in such brines.)

Such acidification, especially at a pH near 1.5, tends to significantly increase the corrosion of the brine-handling equipment. If a downstream heat-exchanger were to be used to handle strongly acidified brines, added wall thickness or excessively costly materials of construction would be required. If added wall thickness heat-exchangers are used, frequent removal of corrosion products from the heat-exchange surfaces may also be required.

Strong acid treatments can also cause other geothermal fluid handling problems, such as the introduction of oxygen into an otherwise oxygen-free brine, the embrittlement of equipment, and the problems associated with reinjection into a subterranean formation. Common commercial acid treatments of geothermal brines have often been limited to relatively small changes in pH such as those treatments disclosed in my U.S. Pat. Nos. 4,500,434, and 5,190,664, the disclosures of which are incorporated by reference herein in their entireties. In U.S. Pat. No. 4,500,434, the moderately acidified brine was flashed in a series of separators and the formation of insoluble silicon components in the brine (and on the solid container surfaces) was substantially inhibited until disposal of the brine. In U.S. Pat. No. 5,190,664, a limited amount of sulfuric acid was added to a high-enthalpy brine prior to the brine passing through the mild steel heat-exchanger and silica scaling was virtually eliminated while corrosion rates were not significantly increased. These treatments yield a residual amount (not the complete elimination) of scale, especially silica, deposited on flash process or heat-exchange equipment in return for acceptable corrosion rates and significant reductions in scaling rates. Reducing scale formation decreases the amount of scale removal, but deposits can still quickly foul solid surfaces making such flash and/or heat-exchange processes impractical without very frequent cleaning—which may, in turn, result in partial or complete shut down of the process, i.e., shorten the process cycle life.

While the aforementioned acidified geothermal brine and modified acidified brine treatments have met with some success in some heat-exchanger and flash-separator (i.e., condensing-flash) surface applications, the need exists for a further improved treating process that further decreases fouling due to scaling by silicon-containing solids, and particularly by metal silicate solids, e.g., aluminum silicates. Controlling fouling tendencies in materials commonly used in heat-exchangers or flash-separators, without significant added cost, would allow economic energy extraction from some high-enthalpy brines. The economic advantages of being able to extract energy in a condensing-flash process is beneficial when high-enthalpy brines contain scale components in near saturation amounts.

Accordingly, this invention provides an improved method for decreasing or essentially eliminating the overall precipitation and scaling of these brines, particularly brines precipitating silica, aluminum-silicate and/or iron-silicate scale, so as to prevent significant fouling of condensing-flash surfaces or heat-exchanger surfaces. It is also desirable to control corrosion of such surfaces when they are composed of commonly used materials of construction, such as low carbon steels.

SUMMARY OF THE INVENTION

Briefly, the present invention provides a method for decreasing or essentially eliminating the scaling of surfaces of geothermal industrial processing equipment caused by the precipitation from geothermal brine of metal silicates such as iron-silicate or aluminum-silicate and/or other metal/silicon-containing scales, amorphous and/or crystalline, whose formation are enhanced in the presence of certain brine-soluble metal species, such as ionic forms of aluminum and/or iron. The problematic high temperature, low salinity geothermal brine generally has a pH from about 4 to about 9 and has a sufficient concentration of brine-soluble metal species (e.g., aluminum and/or iron ionic forms) to form such metal silicate precipitates which encompass at least a portion of the silicon-containing scale. It has been discovered that a brine-soluble metal complexing agent can be added to such geothermal brines in amounts that form one or more water-soluble complexes with the brine-soluble metal species and thus prevent metal silicate formation. Such a metal complexing agent only slightly lowers, usually by no more than about 0.1 pH unit, if at all, the pH of the brine so that corrosion rates are not significantly increased. Preferred metal complexing agents include forms of ethylenediaminetetraacetic acid (i.e., EDTA), citric acid and acetic acid. The addition of metal complexing agents is particularly effective in low salinity geothermal brines containing relatively low concentrations of dissolved solids and especially brine-soluble aluminum species, such as brines containing less than 50,000 ppmw of total dissolved solids, and preferably about 0.1 to about 20 ppmw of brine-soluble aluminum species (calculated as Al).

Scaling can also be alleviated or prevented by combining or substituting a controlled source of a brine-soluble fluoride species with the metal complexing agent to form soluble aluminum or iron complexes that maintain the solubility of the iron and aluminum species and simultaneously maintain the solubility of calcium fluoride in the brine. This reduction or elimination of scaling, together with no significant increase in corrosion, allows low carbon steel flash vessels or heat-exchangers to be used for normal process cycle life (typically up to about 2 years). This cost-minimizing method essentially eliminates the formation of silicon-containing scale (i.e., silicas and/or metal silicates) in these brines without inordinate amounts of other additives.

In a preferred embodiment of the present invention, a high-enthalpy, low salinity geothermal brine feed to a heat-exchanger (in a binary energy extraction process) generally contains a concentration of less than 15 ppmw of brine-soluble aluminum species capable of reacting with silicic acid, oligomers of silicic acid and/or polymers of silicic acid, at a pressure sufficient to maintain the brine as a liquid, e.g., above typical separator or flash pressures. However, even in such brines, although the concentration of trivalent forms of brine-soluble aluminum species and silica species dissolved or suspended therein may be relatively low, the precipitation of metal silicates is still inhibited by the addition to the brine of less than 15 ppmw of a metal complexing agent particularly effective for complexing brine-soluble aluminum species, without complexing or losing effectiveness upon complexing with divalent, alkaline-earth cations (e.g., calcium). The brine normally has a pH from about 5.0 to about 7.0 and is mixed with a water-soluble source of aluminum complexing species in amounts sufficient to maintain dissolved trivalent brine-soluble aluminum species levels in the brine to that which will not exceed saturation levels of precipitated aluminum silicate compounds by more than 10 weight percent. The addition of a metal complexing agent does not lower the pH of the feed brine more than about 0.1 pH unit, and under no circumstances is the brine pH lowered to less than about 4.0 due solely to the effect of the metal complexing agent. Optionally, an additional pH modifier is added to the brine mixture in an amount sufficient to lower the pH to below about 7.0, and usually within the pH range from about 4.0 to about 6.0, but preferably between 4.5 and 5.5.

DETAILED DESCRIPTION OF THE INVENTION

Figure 1:
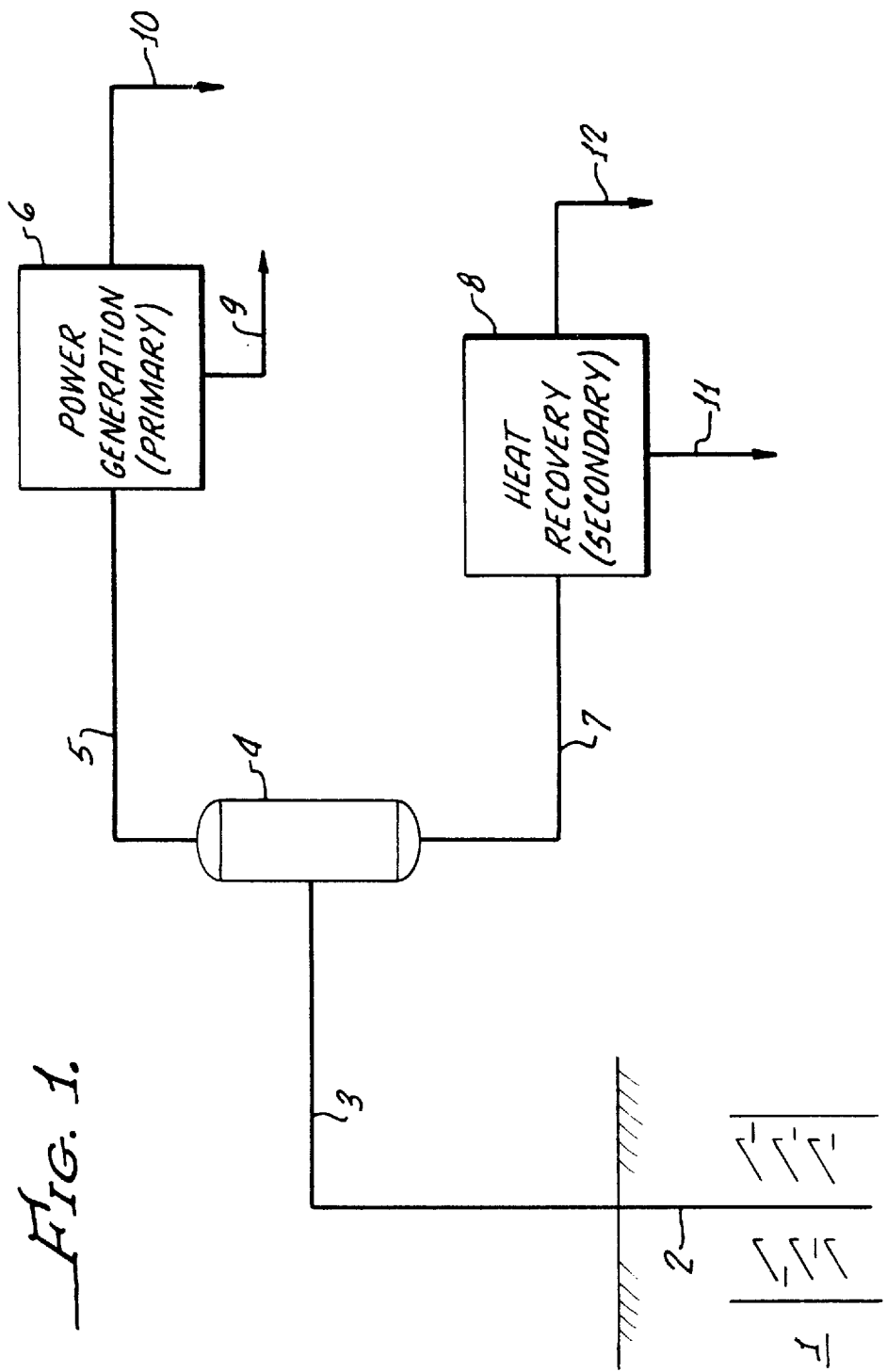
FIG. 1 is a flow scheme of a general geothermal process wherein energy is extracted from both primary and secondary processes.

The present invention relates to converting the thermal energy extracted from hot geothermal fluids and/or brines to electrical power. Such energy is extracted from geothermal brines by passing the brines through industrial processing equipment such as a flash vessel or a heat-exchanger. The very rapid precipitation of dissolved silicon-containing brine components and the subsequent fouling of the surfaces of the processing equipment are caused by the cooling of the brine during the extraction of such energy. Examples of hot pressurized aqueous brine solutions susceptible to such precipitation include high and low enthalpy geothermal fluids having low salinity and containing a mixture of brine, steam and non-condensable gases, or single-phase geothermal aqueous brines. As used herein, aqueous geothermal fluids and brines having "low salinity" contain less than 50,000 ppmw of total dissolved solids (TDS) whereas "high salinity" brines contain at least 50,000 ppmw of TDS. Preferred low salinity geothermal fluids treated in the present invention contain less than about 25,000 TDS, and most preferably less than about 20,000 TDS. Highly specific examples of high-enthalpy, low salinity brines, particularly those containing silicon, aluminum, iron and/or calcium components are found in Bulalo, Tiwi, Leyte (including Tongonan, Malitbog and Mahongandong), Bac-Man, and Palinpinon in the Philippines; Heber and Coso localities in California; Dixie Valley in Nevada; localities in Kyushu, Japan; and more particularly Awibengkok, Silangkitang and other locations in Indonesia.

The aqueous geothermal fluids or brines treated in the present invention contact surfaces to form a number of different types of scale that foul the processing equipment or plug the geothermal reinjection wells and the surrounding formation. By employing the method of the invention, such scales can be inhibited from forming depending on the nature and concentration of the ions and/or metal salts in solution. The scale-forming metal sulfide, metal silicate and other silicon-containing precipitates that foul industrial geothermal processing equipment are usually derived from metal sulfide-containing components, metal-silicate-forming components, and/or other silicon-containing components of the geothermal fluid or geothermal brine. The silicon-containing components usually include silicic acid, polymers of monomeric silicic acid, oligomers of silicic acid, and silicates. The metal silicate-forming components include such silicon-containing components and brine-soluble metal species, such as aluminum, iron and manganese trivalent cations, as well as other ionic and neutral metallic species thereof normally found in geothermal fluids and brines having the herein described pH ranges. Examples of brine-soluble aluminum species include those combined with $OH^-$ species—such as aluminate ion, $Al(OH)^-_4$, a neutral form, $Al(OH)_3^°$, and the cation, $Al(OH)_2^+$, and those combined with halide species—such as $AlCl_2^+$ and $Al(OH)Cl^+$. The metal sulfide-forming components include lead sulfide, iron sulfide, zinc sulfide, copper sulfide and the like. The silicon-containing, metal sulfide-forming and metal silicate-forming components of the geothermal fluid are capable of precipitation and can form scale containing metal silicates and/or polymers containing crystalline or amorphous silicas, metal sulfides, and/or calcium fluoride, calcite or calcite-related products. An aluminum-rich amorphous silica scale preferably inhibited from formation by the present invention contains tetrahydrally-coordinated aluminum substitution within an amorphous silica framework and has an empirical formula of about 10 to about 20 $SiO_2 \cdot Al_2O_3$.

The concentration of brine-soluble metal species in the brine from a geothermal reservoir is theoretically unlimited, but unprocessed or partially processed brines in the invention usually have a concentration of aluminum or iron from about 0.01 to about 50 ppmw (calculated as the monatomic metallic ion), preferably less than 30 ppmw, and often less than 15 ppmw. Problematic, low salinity brines treated by the present invention have concentrations of aluminum and/or iron brine-soluble species from about 0.01 to about 20 ppmw, frequently less than 10 ppmw, and most preferably from 0.05 to 5 ppmw. Furthermore, the low salinity brines treated by the present invention contain relatively small weight proportions of aluminum (as Al) relative to the total dissolved solids, but still greater than about $1.2 \times 10^{-6}$, preferably greater than $1.8 \times 10^{-6}$, and most preferably greater than $2.4 \times 10^{-6}$ (calculated as ppmw Al/ppmw TDS). Moreover, the low salinity brines treated herein have a relatively low ratio of dissolved calcium to dissolved aluminum, i.e., normally less than 40,000:1, preferably less than 10,000:1, and most preferably less than 5,000:1.

It is preferred by the present invention to inhibit silica polymerization, metal sulfide formation, calcium fluoride formation and metal-silicate formation (particularly crystalline and amorphous silicas, and aluminum-, magnesium-and iron-silicates), by maintaining in solution the metallic cation silicates, other silicon-containing components, metal sulfide-forming, and calcium fluoride-forming components of the brine or geothermal fluid by forming soluble complexes with the particular brine-soluble metal species, e.g., metallic cations. The soluble complexes are formed by the present invention at a modest pH in the range from about 4.0 to about 8.0 and preferably about 4.0 to about 6.0, although the pH of the brine prior to modification may be as high as 10.0 to as low as 3.0. An additional pH modifier can be added to the brine to lower the pH to below 7.0, normally to within the range from about 4.0 to about 6.0, and preferably to within the range from about 4.5 to about 5.5. The pH modifiers, which have little or no metallic ion complexing capability, can be added to the brine in combination with the metal complexing agent to lower the pH of the treated aqueous materials into the desired range. Either inorganic mineral acids or organic carboxylic acids may be added as pH modifiers to the flashed or unflashed brines. Such acids include sulfuric acid, sulfurous acid, hydrochloric acid, nitric acid, other conventional pH modifiers, and mixtures thereof.

The fouling, plugging and corrosion problems encountered in prior art methods by passing highly acidized geothermal brines through flashing vessels, heat-exchangers, and/or reinjection wells are overcome herein by complexing the brine-soluble aluminum or iron species of a brine having a modest pH with a metal complexing agent in order to prevent or block such species from interacting with the other scale-forming components and precipitating from the brine.

In general, the active component, i.e., blocking species, of the metal complexing agent (such as anions) are capable of forming a water-soluble complex comprising the brine-soluble metal species of the brine and such blocking species. (Of course, it is understood herein that the mechanism for the complexing of the complexing or blocking species with the brine-soluble metal species may vary due to such factors as pH, brine composition, etc.; however, in all instances herein, by whatever mechanism, a species from the metal complexing agent combines with a species from the brine-soluble aluminum or iron species to form a brine-soluble complex that inhibits formation of a precipitate containing silicon components. Preferably the metal complexing agent causes sequestration of some form of trivalent brine cations such as iron, manganese, and particularly aluminum, with such blocking species. Examples of useful metal complexing agents (containing sequestering anions or other functional species) include citric acid, acetic acid, soluble EDTA, diethylenetriaminepenta-acetic acid (DETPA), salicylic acid, lactic acid, gluconic acid, maleic acid, kojic acid, phthalic acid, tartaric acid, tannic acid, humic acid and the water-soluble salts thereof. Preferred metal complexing agents include citric acid, acetic acid, EDTA, DETPA, and the sodium, potassium and ammonium salts thereof.

When the geothermal aqueous brine solution contains calcium cations in addition to the brine-soluble aluminum species and silicon components, the metal complexing agent (more particularly, the aluminum complexing agent) can include a fluoroborate, a fluoride and/or a source of hydrogen fluoride. Although the addition to the brine of the above-described aluminum complexing agents maintains the brine-soluble aluminum species of the brine in dissolved form, such complexing agents also supply fluoride species to the brine that can cause precipitation of calcium fluoride if the concentrations of calcium and fluoride exceed saturation limits in the brine. Thus, the addition of such aluminum complexing agents must be controlled to maintain concentrations of the combination of calcium and fluoride below precipitation levels. Since the concentration of brine-soluble aluminum species in the problematic brines treated by the present invention are generally less than 30 ppmw as Al, the dosage of added aluminum complexing agent containing the source of fluoride is relatively small and normally less than the concentration of either the calcium cations in the brine and/or calcium fluoride required for precipitation. Examples of such aluminum complexing agents for use in the invention include sodium fluoride, potassium fluoride, lithium fluoride, ammonium fluoride, ammonium hydrogen fluoride, magnesium fluoride, and sources of tetrafluoroborate ions, such as the alkali salts thereof.

In a geothermal power plant containing a flash-condensing and/or binary fluid system, the metal complexing agent can be introduced directly into the aqueous liquid brine or fluid to interact or react with the brine-soluble metal species present, thereby producing in the brine water-soluble complexes that contain the metal species combined with the blocking species of the metal complexing agent.

Scale formation from geothermal fluid or brine can be reduced, and scale previously formed can be removed, by including in the fluid or brine the metal complexing agent in an amount sufficient to inhibit formation of substantial amounts of metal and silicon-containing precipitates (most particularly aluminum or iron silicates), or metal sulfide precipitates, and still not be corrosive. It is preferred that the effect of addition of the metal complexing agent is to essentially not lower the pH of the fluid or brine more than about 0.1 unit.

"Substantial" amounts of precipitates deposited on the surface of the industrial geothermal processing equipment are those amounts which foul the equipment, causing shut down of all or part of the process in order to remove the scale. The scales may reduce the efficiency of the process by increasing pressure drops in pipelines or decreasing heat transfer across surfaces of heat-exchangers. Substantial amounts of metal silicate and silicon-containing and/or metal sulfide precipitates formed in the brine-flowing sections of the processing equipment shorten the process cycle life or increase costs of an otherwise comparable process not containing the metal complexing agent additive. An acceptable scaling rate is usually less than 6 mm/year, and most preferably less than 3 mm/year at flash pressures ranging from 830 KPa to 140 KPa, and in heat exchangers, an acceptable scaling rate is normally less than 6 mm/year, and preferably less than 3 mm/year.

It is preferred that the additions of sufficient metal complexing agent to the brine inhibit substantial scaling due to aluminum while producing improved solubilization of aluminum-containing scale-forming solids contained in the hot or treated brines. In the invention, inhibition, reduction and/or solubilization of scale, particularly aluminum silicate or other aluminum silicon-containing scale, are (is) more effectively accomplished with sufficient concentrations of aluminum complexing agents in the brine to complex or sequester at least 75 weight percent, preferably at least 90 weight percent, and most preferably essentially all of the brine-soluble metal species (e.g., metallic cations) of the brine. Preferred complexing anions, such as citrate, acetate and EDTA anions, are introduced into the brines to form strong water-soluble complexes, particularly with some form of the trivalent aluminum cations in the brine. For instance, a hot brine solution at pH 7 and containing saturated concentrations of dissolved monomeric silica, $Si(OH)_4$, is treated with enough aluminum complexing species so the dissolved silicon-containing components and aluminum species are maintained in solution consistently longer and/or at relatively higher concentrations compared to comparable brine solutions not so treated. During the treatment, the ratio of aluminum complexing species as well as other metal complexing species to brine-soluble aluminum species is about 20:1 to about 1:20, and preferably about 5:1 to about 1:5. It is highly preferred that the concentration of metal complexing agent(s) be about equal to the concentration of aluminum species, and the cost of such agent(s) is usually less than $0.20 per megawatt hours of energy generated.

One embodiment of the invention shown, in general, in simplified form in FIG. 1 includes a geothermal reservoir 1, that exists below the earth's surface and may contain a mixture of steam, brine containing brine-soluble aluminum and iron species, and various other gases including carbon dioxide, hydrogen sulfide, and ammonia. These fluids are produced to the surface via a production well 2. The preferred method of flowing the well is by artesian methods, in which the brine is allowed to boil in the reservoir, or somewhere within the length of the production well, resulting in a self-propelled mixture of steam, gas, and brine at the surface. In some instances the use of a wellhead pump (not shown) may be preferred, depending on characteristics of the reservoir, the chemistry of the brine, and other considerations.

In the embodiment shown in FIG. 1, the mixture of steam, gas, and brine is introduced into a separation vessel 4, by means of a conduit 3, where the steam and non-condensable gases are separated from the brine at a pressure generally in the range of 30 to 300 p.s.i.g., but most commonly from about 100 to 180 p.s.i.g. Such steam and gases are transported via conduit 5 to a primary power generation process 6, which can comprise a condensing steam turbine in which the steam is used directly to produce electrical power, or any "binary" steam power process (e.g., steam condensing heat-exchangers), in which the steam is used to exchange heat with another working fluid, the working fluid then being used to generate electrical power. In either case, the steam is eventually condensed and disposed or otherwise used through conduit 9, while the non-condensable gases pass through conduit 10 for disposal or other uses. The net output of the power generation process 6 is electrical power, steam condensate generally collected through conduit 9, and non-condensable gases generally collected through conduit 10.

The brine from separation vessel 4 can be routed to a secondary, heat recovery process 8 via conduit 7, and a cooler brine recovered through conduit 11, while any non-condensable gases are collected through conduit 12. The thermal energy of the brine may be captured in the secondary power generation process either by conductive cooling of the brine via a heat-exchanger utilizing a working fluid in a binary process, or by causing the brine to boil again (flashing) in order to produce a concentrated brine and additional steam for additional power. Such steam may be used in a condensing turbine or in a binary process. The concentrated brine is generally sent to a reinjection well or other means of disposal. The condensing turbines and/or binary processes within the heat recovery process 8, may be the same or different from those in the primary power generation process 6.

In order to complex/sequester metallic cations in the brine or fluid that may be prone to react with the silicon-components to form scale at one or more locations in the geothermal process shown in FIG. 1, one or more metal complexing agents (and optionally a pH modifier) may be injected into such brine or fluid at the scale-prone locations. Such injections minimize, inhibit, or otherwise control the formation of silicon-containing scales. The injections occur at the following (but not exclusive) strategic locations at a temperature that will form water-soluble complexes with the aluminum species, iron species and/or other metallic cations that form the metal—and silicon-containing precipitates:

1) at a downhole location in the production well 2;
2) into brine before or after a first separator or flash vessel through conduits 3, 7 and 11;
3) into the brine within the secondary heat recovery process 8; and
4) immediately upstream of a reinjection well which disposes the product from processes 6 and/or 8, such as, in some cases, through conduits 9 and/or 11.

Figure 2:
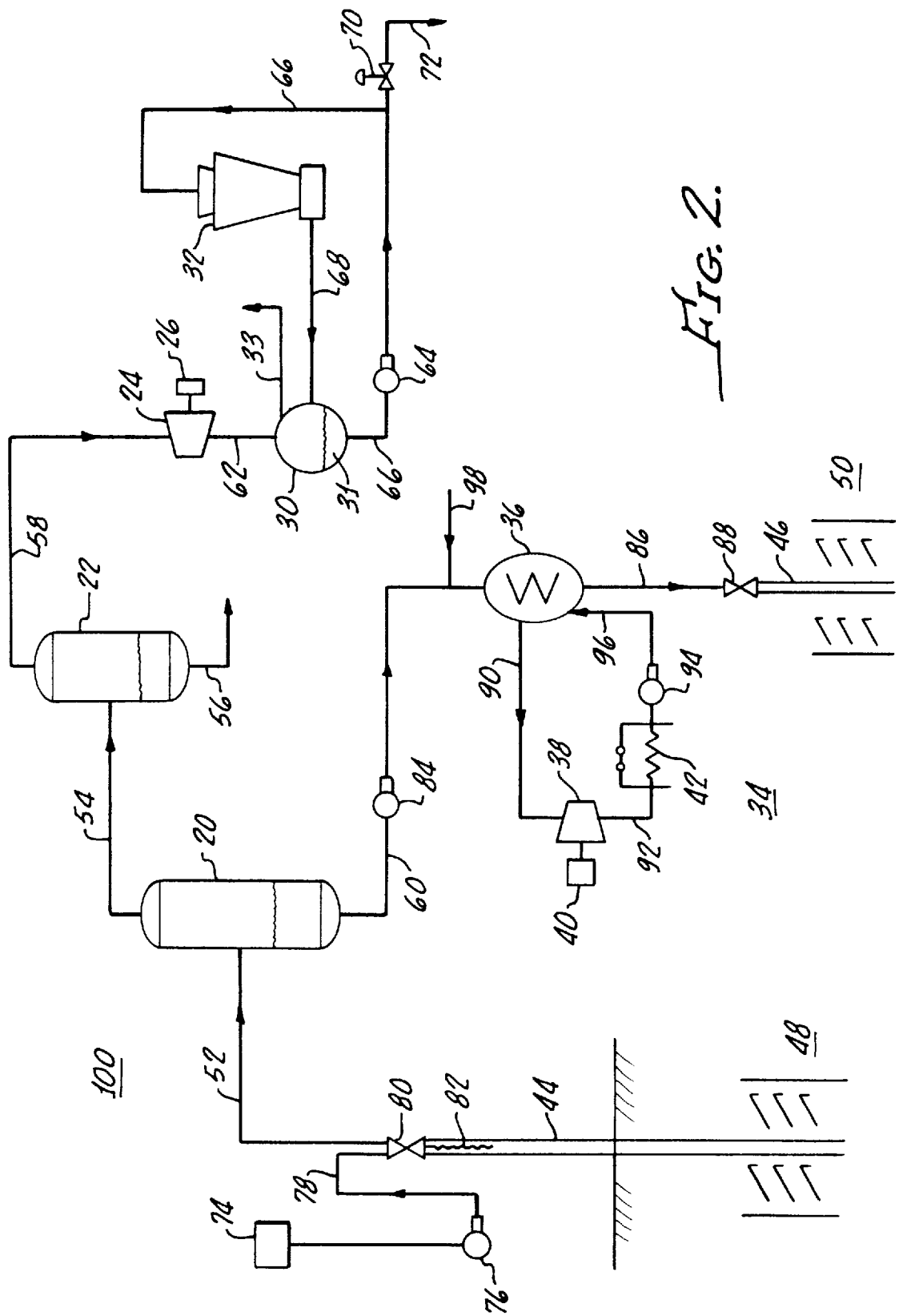
FIG. 2 is a flow scheme of a specific industrial geothermal processing operation wherein energy is primarily extracted from a condensing-flash method and further energy extracted from the product brine therefrom in a heat-exchanger operation.

A preferred embodiment of the invention is shown in simplified form in FIG. 2 encompassing relevant portions of a specific exemplary industrial geothermal processing operation involving a brine power plant 100. Generally, power plant 100 is a primary power generating process including separator (flash vessel) 20, steam scrubber 22, condensing steam turbine 24 and generator 26, direct contact condenser 30, cooling tower 32, and a secondary heat recovery process 34, including binary fluid heat-exchanger 36, turbine 38, generator 40 and condenser 42. Associated with power plant 100, but not actually forming a part thereof, are brine production well 44 and brine reinjection well 46. Production well 44 penetrates into geothermal reservoir 48, and reinjection well 46, which is similar to production well 44, penetrates the same geothermal reservoir 48 or another subterranean reservoir such as 50.

The pH of the brine as it enters production well 44 from geothermal reservoir 48 is typically about 4 to about 7 and usually between about 5 and 6; however, due to eventual removal of the non-condensable gases, the pH of the brine can typically increase to between about 5 and 8. Brine temperature at geothermal reservoir 48 varies considerably from well to well, but is usually in the broad range from about 120° to 325° C., with brine temperature between about 220° and 275° C. being typical of many localities.

In operation, hot geothermal brine containing dissolved salts, including brine-soluble forms of aluminum and/or iron ions or neutral species, silica, non-condensable gases, and steam from geothermal reservoir 48 is introduced under pressure from production well 44 through conduit 52 into the side region of separator 20. The brine is discharged through conduit 52 into the separator, typically at a pressure within the range from about 30 to about 200 pounds per square inch gauge (p.s.i.g.) at the wellhead. Within the separator, the brine is flashed to a substantially lower pressure, such as 125 p.s.i.g., to release the steam. Within separator 20, the non-condensable gases including hydrogen sulfide, carbon dioxide and ammonia, are separated (or stripped) from the geothermal brine. These non-condensable gases and steam are discharged from the top of separator 20 through steam (and gas) conduit 54 into the steam scrubber 22 where any residual brine is removed (via conduit 56) from the steam. The remaining cleaned steam and gases are discharged from the top of steam scrubber 22 through gas conduit 58 to condensing steam turbine 24 which drives generator 26. The gases and steam may also bypass the scrubber and be fed directly to steam turbine 24. The brine is discharged from the bottom of separator 20 and is directed through conduit 60 for further processing, such as to another flash vessel (not shown) or to the hereinafter described heat-exchanger.

All of the condensate and/or steam is discharged from steam condensing turbine 24 through conduit 62 to the direct contact condenser 30 containing a hotwell 31. The condensate from the hotwell is ordinarily pumped (by pump 64) through conduit 66 for routing to cooling tower 32 and the non-condensable gases directed to disposal or other uses via conduit 33. The cooled water from cooling tower 32 flows via conduit 68 back to the contact condenser to effect the condensation of steam from the turbine. A portion of excess water from conduit 66 is passed through level control valve 70 and into conduit 72 for disposal or other uses.

The invention satisfies the need to essentially eliminate scaling and significant fouling in silicon-containing brines (particularly high-enthalpy brines) without drastic reductions in pH and associated corrosion problems. The metal complexing agent is passed to injection points or locations for introduction into the brine or fluid for scale prevention. The metal complexing agent is preferably transported from supply source 74 or other sources for introduction into the brine at injection points such as in reinjection well 46, production well 44, in conduit 60 from separator 20, in conduit 56 from steam scrubber 22, in conduit 66 from direct contact condenser 30, and in conduit 72 from the cooling tower excess water.

When the metal complexing agent is injected into production well 44, the metal complexing agent from supply vessel 74 is removed by pump 76 and pumped through conduit 78 and valve 80 into a coiled tubing injection unit 82 which carries the complexing agent down the well to a location which is preferably below the point where the scaling begins.

While the metal complexing agent can be injected from supply vessel 74 downhole at geothermal reservoir 48 so as to sequester the metallic aluminum cations of the brine as early as practical to its origin, it is desirable to inject the metal complexing agent into the brine flow in places where substantial portions of silicon-containing and/or metal sulfide and/or metal silicate precipitates otherwise occur from more cation-concentrated portions of the brine. By so doing, a more uniform brine modification may be achieved or the amount of metal-silicon component/metal sulfide component solubilized in the brine may be varied according to the amount required at various locations.

In the binary fluid power cycle described in FIG. 2, the brine recovered from separator 20 through conduit 60 is also used to generate power in a secondary heat recovery process similar to that described in the heat recovery process 8 of FIG. 1. The brine is usually a single phase liquid, but may also be a two-phase brine and steam fluid mixture. The recovered brine is passed through conduit 60 from separator 20 to a heat-exchanger 36 at elevated temperature and pressure conditions. The brine may be pumped into the binary heat-exchanger 36 (such as by pump 84), but if the brine from separator 20 is self-flowing, pumping may not be required. The heat is extracted from the brine in heat-exchanger 36, shown schematically as a counterflow heat-exchanger, but cross-flow or other types of heat-exchangers may be used. After heat is transferred to a binary or working fluid, the cooled brine is injected via conduit 86 through valve 88 into reinjection well 46 and subterranean reservoir 50.

Heat-exchanger brine temperature typically ranges from 180° to 300° C., preferably at least 120° C., and most preferably at least 150° C. Brine pressure typically ranges from 896 kPa to 6984 kPa (130 to 1000 p.s.i.g.), preferably no less than 69 kPa (10 p.s.i.g.), and most preferably no less than 793 kPa (115 p.s.i.g.). The heat-exchanger brine outlet temperature typically ranges from 75° C. to 151° C. Total change in brine temperature across the heat-exchanger 36 for most brines typically ranges from 30° C. to 225° C., but preferably a change of at least 100° C. is desired to economically use the brine.

The binary or working fluid on the other side of the heat-exchanger surface of heat-exchanger 36 flows in a closed loop. From an initial temperature, the binary fluid is heated (by exchanging heat within heat-exchanger 36) to a higher temperature and passed via conduit 90 to a turbine 38. The heated binary fluid in the turbine 38 drives generator 40, passes through conduit 92 to be condensed (if the binary fluid is vaporized) in a condenser 42, and is finally re-pressurized by a feed pump 94 prior to passing through conduit 96 back to heat-exchanger 36 where it starts around the closed loop again.

The metal complexing agent can be introduced into the brine in conduit 60 via conduit 98 from a supply vessel 74 (not shown). Although the addition of the metal complexing agent to the brine in conduit 60 is shown to occur near the entry to heat-exchanger 36 via conduit 98 (particularly to control aluminum-silicate scale), it may also occur at other locations such as after heat transfer in conduit 86, or in conduits 92 and 96, if the binary or working fluid includes brine-related materials. Another possible location is downhole at the production well. Control of the amount of metal complexing agent mixed with the brine is often provided by a control valve (or metering pump), which is usually controlled by a sensor (not shown). Sensors may detect dissolved cations and anions and/or pH of the mixture. The sensor produces a control signal for the control valve based upon measured parameters. Other control parameters and locations for sensors are also possible.

The preferred process steps for using the fouling-control apparatus that introduces the metal complexing agent into the brine require the scale-forming components and the pH of the brine to be estimated or measured at brine temperature and pressure conditions. Because of these elevated conditions and ongoing reactions, measurements may require the use of on-line devices or sampling, followed by measurement. The brine pH typically is in the range of from 5.5 to 8.5 units, preferably in the range of from 6.0 to 8.0 units, and most preferably in the range of from 6.0 to 7.0 units. One of the advantages of the present invention is the increase in effectiveness of the metal complexing agent for maintaining in dissolved or non-precipitated forms the metal and silicon-containing scale components of the brine as the pH of the brine (in the above-mentioned ranges) increases during various processing steps.

The concentration of silicon-containing components and reactable brine-soluble metal species in the feed brine may be directly measured, or estimated based upon the predominant species, such as calcium, magnesium, aluminum, iron and barium. These cations are typically found in high-enthalpy brines as precipitates of sulfides, silicon components (e.g., silicates and silicas) and/or carbonates. Also, other cations can react to form precipitates when exposed to sulfide, carbonate or silicon-containing anions, e.g., strontium, radium, silver and lead.

The amount of silicon, including silicon-containing metallic salts, and/or metal sulfides and calcium carbonate in the brine often exceeds saturation levels at process conditions. Estimated silicon, brine-soluble metal species, sulfide, calcium and carbonate concentrations can be more than 105 percent of saturation amounts at feed brine conditions and/or more than 110 percent of saturation amounts at discharge brine conditions.

The heat-exchanger 36 can be of various designs, the preferred being a shell-and-tube heat-exchanger. Prior use of this type of heat-exchanger for low-enthalpy geothermal fluids places the geothermal fluid on the tube side, so that fouling deposits can be more easily cleaned out, for example with traveling plugs or steam lances. Although flowing brine on the tube side is preferred, treated geothermal fluids can now be used on the shell side of this type of heat-exchanger because of the essential elimination of scale and fouling deposits by use of the method of the invention. The heat-exchanger can be composed of a low alloy steel or other conventional materials.

The binary or working fluid is preferably a hydrocarbon fluid, such as pentane, isobutane or an isobutane mixture. The binary fluid can be selected to optimize cycle efficiency at brine inlet and/or brine outlet conditions.

Thus, the invention allows both flash-condensing equipment (separators, flashing vessels, etc.) and binary heat-exchangers comprising commonly available materials to be used with high-enthalpy brines.

Alternative processing schemes of the invention are also possible. These include: using two or more flash steps in separator vessels (e.g., flashing the residual brine from a first separator vessel in a second separator vessel); combining binary and flash steps in a single vessel (e.g., placing heat-exchanger tubes near the bottom of a separator or flash vessel, using the flashed brine on the shell side to heat a binary fluid within the tubes); a series of binary heat-exchangers and heat-exchange process steps (e.g., regenerative heating of a binary fluid followed by geothermal brine heating); and the use of several different binary working fluids. Alternative process steps include: agitating or mixing the metal complexing agent and brine mixture after addition; treating only a portion of the brine feed (e.g., treating a boundary layer of the brine which is proximate to heat-exchange surfaces); and controlling the heat-exchanger brine temperature change such that significant silicon and/or other ionic supersaturation is avoided at the brine heat-exchanger outlet.

The invention is further described by the following examples which are illustrative of a specific mode of practicing the invention and are not intended as limiting the scope of the invention as defined by the appended claims.

Example 1

A silicic acid $(Si(OH)_4)$ solution having a pH of 7.0 is prepared in an autoclave at 100 degrees C. Any insoluble silica components are filtered and the concentration of dissolved monomeric silica in the solution is approximately 300 ppmw (calculated as $SiO_2$). Aliquots of the solution are doped with aluminum cations (5 ppmw, calculated as Al) and then separately mixed with the following metal complexing agents (10 ppmw): sodium EDTA ($Na_4EDTA$) and citric acid. The $SiO_2$/Al/metal complexing agent aliquots, an $SiO_2$/Al aliquot and a blank aliquot containing no aluminum or metal complexing agent are allowed to stand at room temperature (24 degrees C.) for 15, 30, 45, 60, 120, 180 and 240 minutes, after which standing periods each aliquot is filtered and sampled for silica concentration. The results indicating the percentage of remaining dissolved silica compared to the starting amount are summarized in Table 1.

TABLE 1

| Complexing Agent | starting Al Conc. ppmw | Wt % remaining dissolved $Si(OH)_4$ relative to starting dissolved $Si(OH)_4$ weight after the following standing times | | | | | | |
|---|---|---|---|---|---|---|---|---|
| | | 15 Min. | 30 Min. | 45 Min. | 60 Min. | 120 Min. | 180 Min. | 240 Min. |
| None | None | 45 | 32 | 27 | 24 | 22 | 21 | 21 |
| None | 5 | 45 | 32 | 27 | 28 | 24 | 22 | 22 |
| $Na_4$ EDTA | 5 | 49 | 46 | 39 | 36 | 28 | 23 | 21 |
| Citric Acid | 5 | 55 | 43 | 38 | 31 | 25 | 23 | 20 |

As indicated in Table 1, the sodium EDTA and citric acid complexing agents consistently maintain relatively high amounts of dissolved silicon components in the aluminum-containing silicic acid solution during the extended periods from about one to about 60 minutes, i.e., the typical residence time periods which the hot geothermal brines or fluids are exposed to or in contact with the geothermal processing equipment (including well liners) from extraction of the fluid via a production well to passage through the equipment and to reinjection of the spent brine via a reinjection well.

Example 2

In a similar manner to Example 1, aliquots of an aqueous solution containing 5 ppmw of aluminum cations (as Al), are separately treated with the metal complexing agents of Example 1 (10 ppmw) and compared to a blank containing only aluminum cations. The aliquots are filtered and sampled for aluminum concentration. The results indicating the percentage reduction of the remaining dissolved aluminum cations compared to the starting amount are summarized in Table 2.

TABLE 2

| Complexing Agent | starting Al Conc. ppmw | Wt % remaining dissolved Al relative to starting dissolved Al weight after the following standing times | | | | | | |
|---|---|---|---|---|---|---|---|---|
| | | 15 Min. | 30 Min. | 45 Min. | 60 Min. | 120 Min. | 180 Min. | 240 Min. |
| None | 5 | 5 | 4.5 | 4 | 27 | 30 | 25 | 25 |
| $Na_4$ EDTA | 5 | 63 | 47 | 44 | 34 | 35 | 24 | 27 |
| Citric Acid | 5 | 40 | 37 | 35 | 28 | 30 | 24 | 25 |

As indicated in Table 2, the aluminum concentration of the solutions treated with either the sodium EDTA or the citric acid completing agents is significantly greater compared to that of the untreated solution. Maintaining the soluble aluminum concentration, particularly over the first hour, (i.e., normal residence time to maintain solubilization in the industrial processing equipment) demonstrates the effectiveness of the complexing agents for complexing aluminum cations and consequently reducing or preventing the precipitation of aluminum with dissolved silicon-containing compounds, e.g., the inhibition of aluminum silicate formation.

Example 3

Aliquots of a silicic acid solution having a concentration of 1,000 ppmw, calculated as $SiO_2$, are separately treated with acid or base to produce solutions having pH values of 3 through 10, inclusive. Such aliquots are divided into two Groups, i.e., A and B, which are doped with aluminum cations to produce solutions having initial concentrations of 0.5 and 5 ppmw of aluminum cations, respectively. Individual aliquots of Groups A and B are separately treated with 10 ppmw of the following metal complexing agents: sodium EDTA, citric acid, acetic acid, and sodium phosphonate. The treated aliquots and a blank containing no metal complexing agent are sampled for aluminum cation concentration after 2 hours, the results calculated as $-\log[Al^{3+}]$ and summarized in Table 3.

TABLE 3

Aluminum Concentration, $-\log[Al^{3+}]$

Group A

| pH | 0.5 ppmw Al (untreated) | Na$_4$EDTA | Citric Acid | Sodium, Phosphonate | Acetic Acid |
|---|---|---|---|---|---|
| 3 | 4.63 | — | — | — | — |
| 4 | 4.73 | 4.76 | 4.74 | 5.43 | 4.63 |
| 5 | 5.73 | 5.48 | 5.1 | 5.43 | 4.68 |
| 6 | 5.83 | 5.19 | 5.73 | 5.73 | 5.13 |
| 7 | 5.73 | 5.19 | 5.13 | 5.73 | 5.13 |
| 8 | 5.13 | 4.95 | 5.13 | 5.13 | 5.19 |
| 9 | 4.95 | 4.8 | 4.73 | 5.73 | 4.63 |
| 10 | 4.63 | — | — | — | — |

Group B

| pH | 5 ppmw Al (untreated) | Na$_4$EDTA | Citric Acid | Sodium, Phosphonate | Acetic Acid |
|---|---|---|---|---|---|
| 3 | 3.73 | — | — | — | — |
| 4 | 3.76 | 3.79 | 3.8 | 4.65 | 3.73 |
| 5 | 3.95 | 3.83 | 3.93 | 4.78 | 3.76 |
| 6 | 4.33 | 4.08 | 4.08 | 4.69 | 4.12 |
| 7 | 4.26 | 3.9 | 4.13 | 4.89 | 4.12 |
| 8 | 4.08 | 3.81 | 3.93 | 4.89 | 3.98 |
| 9 | 3.95 | 3.78 | 3.91 | 5.03 | 3.9 |
| 10 | 3.73 | — | — | — | — |

The dissolved aluminum cation concentrations in the treated solutions are maintained or improved at pH values between 4 and 9 compared to those of the untreated solutions. However, the data in Table 3 indicate, in general, that all the metal complexing agents, except sodium phosphonate in Group B, maintain a substantial dissolved aluminum cation concentration in the SiO$_2$/Al solution over the pH range from about 4.0 to about 9.0. Such results are consistent for treatments involving solutions having initial aluminum cation concentrations having as little as about 0.1 to about 5 ppmw (such as 0.5 ppmw Al in the Group A samples), or at higher concentrations in the range from 1 to 30 ppmw (such as 5 ppmw Al in the Group B samples). Furthermore, even the sodium phosphonate metal complexing agent is effective over the pH range from about 4.5 to less than 8.0 for the SiO$_2$/Al solutions of Group A.

Example 4

In a similar manner to Example 3 and over the same integral pH range, silicic acid aliquots containing 1,000 ppmw (as SiO$_2$), and 0.5 ppmw (as Al), i.e., Group C, or 5 ppmw (as Al), i.e., Group D, are treated with the metal complexing agents (10 ppmw) of Example 3. The treated and untreated aliquots are sampled for silica concentration after 2 hours, the results calculated as $-\log[Si(OH)_4]$ and summarized in Table 4.

TABLE 4

Silica Concentration, $-\log[Si(OH)_4]$

Group C

| pH | 0.5 ppmw Al (untreated) | Na$_4$EDTA | Citric Acid | Sodium, Phosphonate | Acetic Acid |
|---|---|---|---|---|---|
| 3 | 1.82 | — | — | — | — |
| 4 | 1.82 | 1.82 | 1.8 | 1.81 | 1.82 |
| 5 | 1.93 | 1.93 | 1.88 | 1.93 | 1.82 |
| 6 | 2.19 | 2.18 | 2.18 | 2.19 | 2.19 |
| 7 | 2.44 | 2.36 | 2.36 | 2.37 | 2.36 |
| 8 | 2.4 | 2.32 | 2.4 | 2.31 | 2.35 |
| 9 | 2.36 | 2.36 | 2.36 | 2.21 | 2.32 |
| 10 | 1.825 | — | — | — | — |

Group D

| pH | 5 ppmw Al (untreated) | Na$_4$EDTA | Citric Acid | Sodium, Phosphonate | Acetic Acid |
|---|---|---|---|---|---|
| 3 | 1.82 | — | — | — | — |
| 4 | 1.81 | 1.8 | 1.8 | 1.8 | 1.78 |
| 5 | 1.93 | 1.88 | 1.85 | 1.83 | 1.84 |
| 6 | 2.08 | 2.02 | 2.05 | 1.99 | 2.01 |
| 7 | 2.38 | 2.33 | 2.36 | 2.3 | 2.32 |
| 8 | 2.38 | 2.4 | 2.38 | 2.41 | 2.41 |
| 9 | 2.44 | 2.44 | 2.38 | 2.33 | 2.37 |
| 10 | 1.834 | — | — | — | — |

The dissolved silica concentration in the treated solutions is also maintained or improved at a pH between 4 and 8 compared to that of the untreated solutions. However, the data in Table 4 indicate, in general, that all the metal completing agents maintain a substantial silica concentration in the SiO$_2$/Al solutions over the integral pH range from about 4.0 to about 9.0. Such results are consistent for treatment of solutions having initial aluminum cation concentrations as little as about 0.1 to about 5 ppmw (such as 0.5 ppmw Al in the Group C samples), or at higher concentrations in the range from 1 to 30 ppmw (such as 5 ppmw Al in the Group D samples). Furthermore, the metal complexing agents are most effective over the pH range from above 4.0 to about 7.5 for the SiO$_2$/Al solutions of Group D.

While the preferred embodiment of the invention has been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

I claim:

1. A method for inhibiting the precipitation of aluminum silicate scale from a hot pressurized geothermal fluid having a total dissolved solids content of less than 50,000 ppmw, a brine-soluble aluminum species content (calculated as Al) of about 0.1 to about 20 ppmw, a pH from about 4.0 to about 9, and dissolved silicon-containing components capable of forming a precipitate containing aluminum silicate when sufficient thermal energy is removed from the geothermal fluid, the method comprising the steps of:

(a) flashing the geothermal fluid to produce steam and a brine containing the dissolved silicon-containing components;

(b) adding an aluminum complexing agent selected from the group consisting of citric acid, acetic acid, EDTA, DETPA, salicylic acid, lactic acid, gluconic acid, maleic acid, kojic acid, phthalic acid, tartaric acid, tannic acid, humic acid, and the water soluble salts thereof, to the brine in a concentration of 0.01 to 30 ppmw to form a fluid mixture containing a soluble complex comprising aluminum and silicon-containing components, where the pH of the fluid mixture is substantially the same as the pH of the brine;

(c) flowing the fluid mixture in contact with a surface of a geothermal heat-exchanger to reduce the temperature of said fluid mixture; and (d) flowing the fluid mixture obtained from step (c) without forming a substantial amount of the precipitate.

2. The method of claim 1 where the aluminum complexing agent is added to said geothermal fluid after or during step (a) in a concentration from about 0.05 to about 5 ppmw and the precipitate comprises aluminum-rich amorphous silica.

3. The method of claim 1 where the geothermal fluid or the brine comprises less than 30,000 ppmw of total dissolved solids.

4. The method of claim 1 where the geothermal fluid or the brine has a total dissolved solids content of less than 25,000 ppmw.

5. The method of claim 1 where the geothermal fluid or the brine has a total dissolved solids content of less than 20,000 ppmw.

6. The method of claim 1 where the metal complexing agent is added to the geothermal brine in a concentration less than 15 ppmw.

7. The method of claim 1 where the metal complexing agent is added to the geothermal brine in a concentration of 10 ppmw or less.

8. The method of claim 1 where the metal complexing agent is selected from the group consisting of the citric acid, acetic acid, EDTA, DETPA, and the water soluble salts thereof.

* * * * *